United States Patent
Reinhard-Herrscher et al.

(10) Patent No.: US 10,677,474 B2
(45) Date of Patent: Jun. 9, 2020

(54) OVEN DOOR AND OVEN COMPRISING AN OVEN DOOR

(71) Applicant: Electrolux Appliances Aktiebolag, Stockholm (SE)

(72) Inventors: Fabienne Reinhard-Herrscher, Rothenburg ob der Tauber (DE); David Joao Machado Martins, Rothenburg ob der Tauber (DE); Nicolas Monroy, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 215 days.

(21) Appl. No.: 15/531,585

(22) PCT Filed: Dec. 9, 2015

(86) PCT No.: PCT/EP2015/079051
§ 371 (c)(1),
(2) Date: May 30, 2017

(87) PCT Pub. No.: WO2016/096550
PCT Pub. Date: Jun. 23, 2016

(65) Prior Publication Data
US 2017/0328577 A1    Nov. 16, 2017

(30) Foreign Application Priority Data
Dec. 19, 2014   (EP) .................... 14199089

(51) Int. Cl.
*F24C 15/02* (2006.01)
*F24C 7/08* (2006.01)
(Continued)

(52) U.S. Cl.
CPC .......... *F24C 15/024* (2013.01); *E05B 1/0084* (2013.01); *E05B 17/10* (2013.01);
(Continued)

(58) Field of Classification Search
CPC .................................................. F24C 15/024
(Continued)

(56) References Cited

U.S. PATENT DOCUMENTS 4,363,315 A * 12/1982 von Blanquet ......... F24C 15/04
126/19 R
5,609,939 A *  3/1997 Petersen ................ G03B 21/60
349/62
(Continued)

FOREIGN PATENT DOCUMENTS

DE    102004062751 A1    7/2006
DE    102010003103 A1    9/2011
(Continued)

OTHER PUBLICATIONS

Written Opinion and International Search Report issued in PCT/EP2016/052669 dated Apr. 19, 2016, 9 pages.
(Continued)

*Primary Examiner* — Grant Moubry
*Assistant Examiner* — Aaron H Heyamoto
(74) *Attorney, Agent, or Firm* — Pearne & Gordon LLP

(57) ABSTRACT

The invention relates to an oven door (10) for closing an oven cavity (2) comprising a door glass (11) being at least partially transparent for enabling a user to look into the oven cavity and a door handle (12) for opening the door, wherein the door handle (12) comprises a projection unit (13) being adapted to project light onto an projection area of the door glass (11) in order to provide a graphical display on the door glass (11) and wherein the door glass (11) is adapted to emit or reflect light towards the space in front of the oven door (11) based on the light provided by the projection unit (13) in order to provide information to a user in front of the oven door (11).

17 Claims, 3 Drawing Sheets

(51) Int. Cl.
*E05B 1/00* (2006.01)
*E05B 17/10* (2006.01)
*F24C 15/00* (2006.01)
*F24C 15/04* (2006.01)
*G03B 21/62* (2014.01)
*G03B 29/00* (2006.01)

(52) U.S. Cl.
CPC ............ *F24C 7/085* (2013.01); *F24C 15/006* (2013.01); *F24C 15/04* (2013.01); *G03B 21/62* (2013.01); *G03B 29/00* (2013.01)

(58) Field of Classification Search
USPC ........................................................ 126/19 R
See application file for complete search history.

(56) References Cited

U.S. PATENT DOCUMENTS

| | | | |
|---|---|---|---|
| 7,947,374 B2 | 5/2011 | Thomsen et al. | |
| 9,115,902 B2 | 8/2015 | Danzer et al. | |
| 2003/0113550 A1* | 6/2003 | Millett | A47F 3/0434 |
| | | | 428/432 |
| 2007/0158330 A1 | 7/2007 | Kim et al. | |
| 2009/0121970 A1 | 5/2009 | Ozbek | |
| 2010/0139638 A1* | 6/2010 | Hargrave | F24C 15/008 |
| | | | 126/19 R |
| 2010/0206290 A1 | 8/2010 | Thomsen et al. | |
| 2011/0030763 A1 | 2/2011 | Lewis | |
| 2013/0019854 A1* | 1/2013 | Lim | F24C 15/04 |
| | | | 126/198 |
| 2013/0119838 A1 | 5/2013 | Becker et al. | |
| 2014/0185282 A1* | 7/2014 | Hsu | F21V 9/08 |
| | | | 362/231 |
| 2014/0201664 A1* | 7/2014 | Guilleminot | H05B 1/0263 |
| | | | 715/771 |
| 2014/0210793 A1* | 7/2014 | Eriksson | G06F 1/169 |
| | | | 345/175 |
| 2015/0047624 A1 | 2/2015 | Luckhardt et al. | |
| 2017/0099988 A1 | 4/2017 | Matloubian et al. | |
| 2017/0159942 A1* | 6/2017 | Ivanovic | F24C 15/045 |
| 2019/0003722 A1* | 1/2019 | Altan | F24C 15/12 |

FOREIGN PATENT DOCUMENTS

| | | |
|---|---|---|
| DE | 102011007407 A1 | 10/2012 |
| EP | 1489364 A1 | 12/2004 |
| EP | 2182503 A1 | 5/2010 |
| EP | 2189727 A1 | 5/2010 |
| EP | 2515044 A1 | 10/2012 |
| EP | 2813765 A1 | 12/2014 |
| WO | 2014118295 A1 | 8/2014 |
| WO | WO-2014118295 A1 * | 8/2014 ................ F24C 7/08 |

OTHER PUBLICATIONS

International Search Report and Written Opinion issued in corresponding application No. PCT/EP2015/079051 dated Jan. 15, 2016, 9 pages.

* cited by examiner

OVEN DOOR AND OVEN COMPRISING AN OVEN DOOR

Generally, the present invention relates to the field of food preparation appliances. More specifically, the present invention relates to an oven door comprising a user interface for displaying information.

BACKGROUND OF THE INVENTION

Ovens for food preparation are well-known in prior art. Said ovens comprise a base body forming an oven cavity with a cavity opening for receiving the food to be prepared. In addition, the oven comprises a door for closing the cavity opening. The oven door acts as thermal barrier to keep the heat energy in the cavity during operation of the oven. Typically, oven doors are at least partially transparent in order to enable the user to control the food preparation process within the closed cavity. State of the art ovens comprise a user interface located above the oven door and attached to the oven base body for providing information to the user, e.g. baking temperature, baking period etc.

German patent application DE 10 2011 007 407 A1 discloses a household appliance comprising a LCD display at the household appliance door.

SUMMARY OF THE INVENTION

It is an objective of the embodiments of the invention to provide an oven door and an oven with a graphical user interface providing an enhanced visibility of information displayed at said graphical user interface. The objective is solved by the features of the independent claims. Preferred embodiments are given in the dependent claims. If not explicitly indicated otherwise, embodiments of the invention can be freely combined with each other.

According to an aspect of the invention, the invention relates to an oven door for closing an oven cavity comprising a door glass being at least partially transparent for enabling a user to look into the oven cavity and a door handle for opening the door, wherein the door handle comprises a projection unit being adapted to project light, respectively, graphical information onto an projection area of the door glass in order to provide a graphical display on the door glass and wherein the door glass is adapted to emit or reflect light towards the space in front of the oven door based on the light provided by the projection unit in order to provide information to a user in front of the oven door. Said graphical oven display using projection technology is advantageous because by including the projection unit in the door handle, the heat impact of heat radiated by the oven cavity onto the projection unit is low. In addition, a graphical display with high brightness and a wide angle of view is achieved which provides a great display size in comparison to state of the art displays included in the cover plate above the oven door.

According to embodiments, the door glass comprises a least a light emission layer including particles, said particles being adapted to emit light towards the space in front of the oven door based on the light provided by the projection unit. Preferably, said particles may be nanoparticles, wherein the particles may be integrated in the glass pane, i.e. the particles are integral part of the glass pane. Said particles show fluorescence behaviour, i.e. when activated by the light emitted by the projection unit, the particles emit light in the visible wavelength range. Said particles may be equally or essentially equally distributed across the graphical display and may be selectively activated by light provided by the projection unit. Said light provided by the projection unit comprises light intensity distribution according to the information to be displayed and causes florescence effect, respectively, light emission according to said light intensity distribution.

According to embodiments, the door glass comprises a transparent film comprising particles, said particles being adapted to emit light towards the space in front of the oven door based on the light provided by the projection unit. Preferably, said particles may be nanoparticles. Said film comprising said particles may be transparent in the visible wavelength region and may be adhered, printed or deposited at the glass pane of the door glass. Thus, standard door glass can be chosen, for example so-da-lime glass or safety glass.

According to embodiments, said particles are fluorescent particles which are adapted to emit light when activated by light of a certain activation wavelength and wherein the projection unit is adapted to emit light according to said activation wavelength. The light provided by the projection unit may be absorbed by said fluorescent particles and the energy of said absorbed light is used to emit light in the visible wavelength range.

According to embodiments, the projection unit is adapted to emit light in the UV- or IR-wavelength spectrum. So, the projection unit may provide light in the invisible spectrum range. Said activation light is used to excite fluorescence lightning of said particles thereby converting light from the invisible spectrum range into light in the visible spectrum range.

According to other embodiments, the door glass comprises a holographic glass comprising particles adapted to reflect light provided by the projection unit towards the space in front of the oven door. The projection unit may provide light in the visible spectrum range. Said light is directly reflected by mirror-like particles within the holographic glass thereby displaying information provided by the projection unit at the oven door glass.

According to embodiments, the projection unit is a Liquid Crystal on Silicon (LCoS) projection unit, a Digital Light Processing (DLP) projection unit or a micro-electromechanical system (MEMS) projection unit.

According to embodiments, the oven door comprises a user control interface, said user control interface being at least partially located in the area of the graphical display, the user control interface being adapted to detect user interactions for controlling the oven. In other words, the user control interface may be also provided at the oven door glass. Thereby, the user not only receives information displayed at the graphical display but is also able to control the oven by touching a certain area or region (e.g. a displayed button) of the door glass.

According to embodiments, the user control interface comprises a touch-sensitive interface of resistive or capacitive type, an infrared touch interface or a touch interface based on surface acoustic waves. By means of said types of user control interfaces touch positions can be detected. Said touch positions may be correlated with certain control information in order to determine the desired user input.

According to other embodiments, the user control interface comprises optical touch and/or gesture recognition means. Said optical touch and/or gesture recognition means make use of infrared transmitters and infrared cameras for determining the touch or approximation position of an object (e.g. the finger of a user). Advantageously, the user input may also be achieved by approximation of an object (e.g. the user's finger) to a certain section of the user control interface, i.e. touching of the user control interface may not be necessary.

According to embodiments, the door glass comprises at least two glass panes, said glass panes being arranged at a distance from one another in order to form a space between adjacent glass panes. Thereby, the heat impact on the user control interface unit and/or the projection unit is significantly lowered.

According to embodiments, the space between said two glass panes is filled with an inert gas. Thereby, the heat impact on the user control interface unit and/or the projection unit is further decreased.

According to embodiments, the oven door comprises cooling means for providing an airflow flowing through a space between two glass panes. Thereby, it is possible to actively cool down the user control interface which may be included in said space between said two glass panes.

According to a further aspect, the invention refers to an oven for preparing food. Said oven comprises an oven cavity and an oven door for closing the oven cavity. The oven door is configured according to the embodiments described above.

According to further embodiments, the projection unit and/or the user control interface of the oven door is electrically coupled with a control unit and/or power supply arranged in the oven base body via an electrical wiring, an inductive coupling, door contacts and/or wireless transmission means. Also a mixture of wireless and wired connections is possible. For example, the electric power is transmitted using a cable connection whereas the control signal transmission between the oven door and the oven base body is realized by wireless signal transmission, e.g. Bluetooth.

The terms "essentially", "substantially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
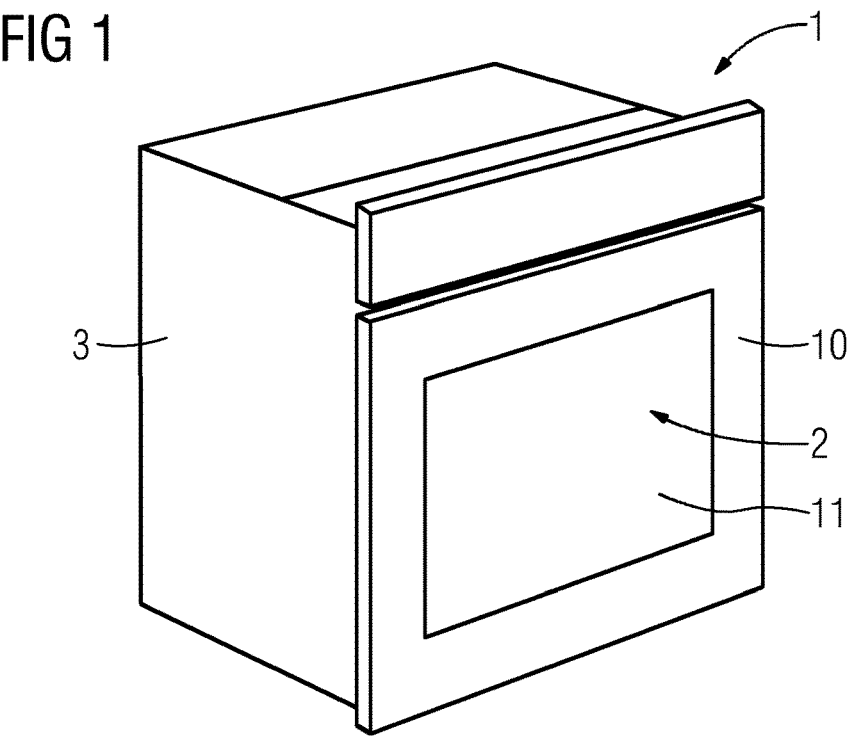
FIG. 1 shows an example schematic view of a baking oven.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic diagram of a baking oven 1. The baking oven 1 comprises an oven base body 3 with an oven cavity 2 which is adapted to receive the food to be cooked and/or baked. The baking oven 1 further comprises an oven door 10 which can be opened in order to place the food into the oven cavity 2 and closed in order to obtain a closed oven cavity 2.

Figure 2:
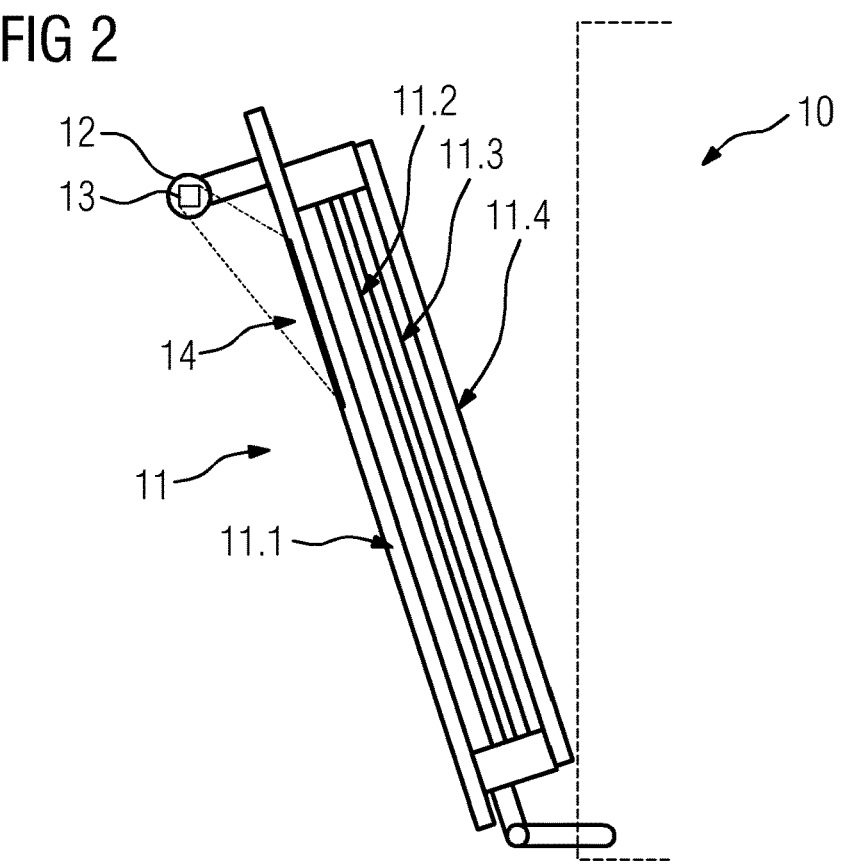
FIG. 2 shows an example schematic sectional view of an oven door according to an embodiment.
Figure 3:
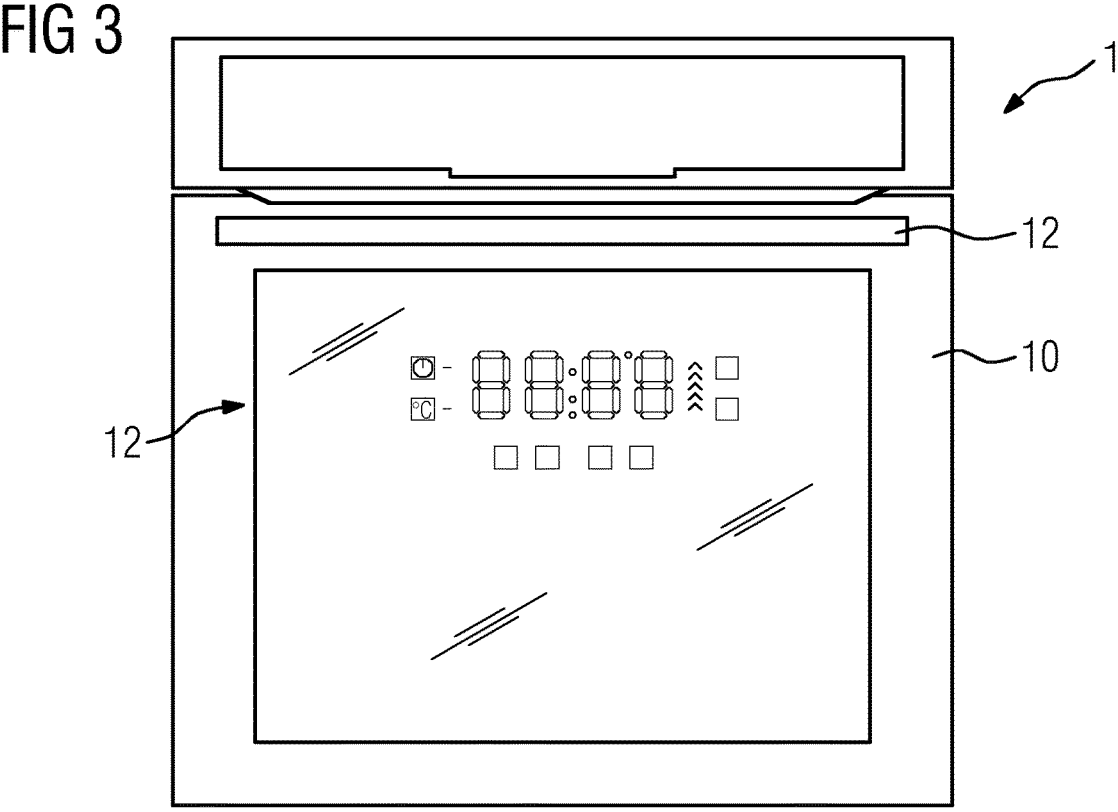
FIG. 3 shows an example front view of an oven comprising a graphical display in the area of the oven door glass.

FIG. 2 shows the oven door 10 in closer detail. The oven door 10 comprises a frame or another structural element, for example a door bar and a set of door columns which may border the oven door 10 circumferentially. The frame or set of door bars/door columns 10.2 may build the supporting structural element of the oven door 10, by means of which the oven door is attached to the base body of the oven 1. The oven door 10 further comprises a transparent door glass 11 in order to enable a user to look into the oven cavity 2 during food preparation process without opening the oven door 10. The door glass 11 may be soda-lime glass or safety glass.

The door glass 11 may comprise at least two glass panes, according to the embodiment of FIG. 2, four glass panes 11.1-11.4 which are arranged in a sandwich-like structure. Of course, according to other embodiments, the oven door 10 may also comprise more than four glass panes or less than four glass panes. Said glass panes 11.1-11.4 are arranged at a distance to each other thereby confining a space between them. Preferably, the door glass 11 may comprise at least three glass panes, namely a first glass pane 11.1 forming the outer glass pane (with respect to the oven cavity), a second glass pane 11.2 forming an intermediate glass pane and a third glass pane 11.3 forming the inner glass pane being closer to the oven cavity 2 than the first and second glass pane.

The oven door 10 further comprises a graphical display 14 for displaying graphical information, e.g. alphanumeric characters in the area of the door glass 11. Said graphical display is obtained by projecting light, respectively graphical information, onto at least a portion of the door glass 11. More in detail, the oven door 10 comprises a door handle 12 for opening/closing the oven door 10. Said door handle includes a projection unit 13 being adapted to project light onto at least an area of the door glass. Said projection unit 13 may be arranged at an aperture at the bottom side of the door handle 12 and may be configured to emit light at an angle towards the door glass 11 in order to display information at said door glass 11.

Said projection unit 13 may be formed by any projector which can be integrated in or arranged at the door handle 12. For example, the projection unit 13 is a Liquid Crystal on Silicon (LCoS) projection unit, a Digital Light Processing (DLP) projection unit or a micro-electromechanical system (MEMS) projection unit.

According to an embodiment, the graphical display uses the fluorescence effect in order to provide a graphical display with high brightness and a large angle of view. The projection unit 13 is adapted to emit excitation light towards the door glass 11. Said door glass 11 comprises particles, specifically nanoparticles being adapted to absorb said excitation light. By absorbing said excitation light, said nanoparticles are excited and emit light in the visible wavelength range. In other words, the light provided by the projection unit 13 is not directly reflected by the door glass 11 but is transformed by means of the fluorescence effect in light in the visible wavelength range which can be recognized by the user in front of the oven 1. It is worth mentioning that the excitation light provided by the projection unit 13 comprises all the information to be displayed by the graphical display and causes a selective excitation of particles in or at the door glass in order to display said information. The particles to be excited by the excitation light are uniformly distributed all over the graphical display 14.

Said particles may be fluorescent nanoparticles which are directly included in the door glass 11, i.e. the door glass itself comprises said fluorescent particles. According to other embodiments, the door glass 11 may comprise a layer or film, said layer or film may comprise said fluorescent particles. The film or layer may be adhered, printed or deposited on the door glass 11.

The projection unit 13 may be adapted to provide excitation light according to a certain wavelength or wavelength range in order to excite said fluorescent particles. The excitation wavelength may be in the non-visible wavelength region, e.g. in the infrared (IR) (700 nm to 1 mm) or UV-wavelength (400 nm to 10 nm) region.

According to another embodiment, the oven door 10 comprises a holographic door glass 11. Said holographic door glass 11 comprises mirror-like particles. Said particles may be adapted to cause scattering or reflection effects thereby scattering or reflecting light emitted by the projection unit 13 towards the space in front of the oven door 10. So, in contrary to the upper-mentioned embodiment, the light emitted by the projection unit 13 is directly reflected or scattered without using fluorescence effect. Therefore, when using holographic glass, the projection unit 13 is adapted to emit light in the visible wavelength range.

The oven door glass 11 may comprise a sandwich-like structure comprising multiple glass panes 11.1-11.4. The oven door 10 may comprise at least two glass panes 11.1-11.4 which are arranged at a distance to each other in order to improve the heat isolation. In other words, there is a space between two adjacent glass panes. Said space may be filled with an inert gas in order to improve the heat isolation. The inert gas may be argon or molecular Nitrogen (N2). Said space may be hermetically sealed in order to avoid a leakage of said inert gas. For further enhancing the heat insolation capabilities, one or more glass panes 11.1-11.4 may comprise a heat-reflective coating.

Still alternatively or additionally, the oven door 10 may comprise cooling means comprising a fan or blower for conveying air through the space between two adjacent glass panes.

In order to control the oven, the oven door 10 may further comprise a user control interface 30. Said user control interface 30 may be included in the door glass 11. Specifically, the user control interface 30 may be included in a space between two adjacent glass panes, for example, in the space between the first and second glass pane 11.2, 11.2. By means of the user control interface 30, the user is able to control the oven 1, for example activate a certain baking program or choose the desired baking temperature. Preferably, the areas, at which the graphical display 14 and the user control interface 30 are provided at the oven door glass 11, may overlap in order to be able to detect touch or approximation of control means (e.g. the finger of a user) in the display area.

Figure 4:
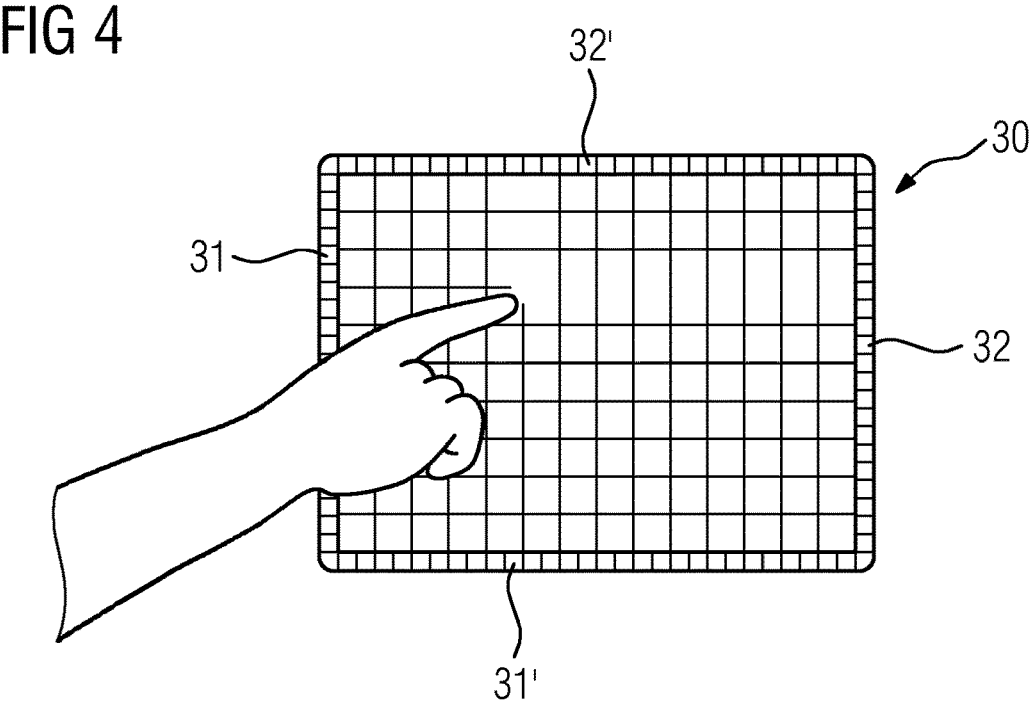
FIG. 4 shows an example user control interface for enabling user inputs at the door glass.

According to an embodiment, the user control interface 30 may be an infrared touch screen. As shown in FIG. 4, multiple infrared emitters 31, 31' and infrared receivers 32, 32' are arranged at the edges of the control interface 30. More in detail, a first row of infrared emitters 31 may be arranged in a horizontal direction providing transmission of IR-radiation in a vertical direction and a second row of infrared emitters 31' may be arranged in a vertical direction providing transmission of IR-radiation in the horizontal direction. Opposite to the rows of infrared emitters 31, 31', corresponding rows of infrared receivers 32, 32' may be arranged adapted to receive the IR-radiation transmitted by said infrared emitters 31, 31'. By means of said infrared emitters 31, 31' and infrared receivers 32, 32' a detection grid is formed which may be used to detect the position of an object based on the information which optical receiver within the row of optical receivers does not receive IR-radiation because of blocking of IR-radiation by the object.

According to another embodiment, the user control interface 30 may be a touchpad of resistive or capacitive type. For realizing said touchpad, a touch-sensitive layer may be placed behind the door glass 11 or may be integrated within the door glass 11. Preferably, the touch-sensitive layer may be placed behind or integrated in the first glass pane 11.1 of the door glass 11. In case of a resistive type of touchpad, a control unit coupled with the touch-sensitive layer may be adapted to localize the touch position based on a local change of electrical resistance in the area of the touch-sensitive layer. In case of a capacitive touchpad type, a control unit coupled with the touch-sensitive layer may be adapted to localize the touch position based on a local change of electrical capacitance in the area of the touch-sensitive layer.

Another type of touchpad may comprise a transparent ink printed at an area of the first glass pane 11.1, preferably at the inner side of the first glass pane 11.1. Said ink may comprise electrical properties which change when touching the glass pane in the area of said printing. A control unit coupled with said touchpad may detect and localize said change of electrical properties in order to associate said touch event with a certain control input of the user.

According to yet another embodiment, the user control interface 30 may include a surface acoustic wave touchpad. The surface acoustic wave touchpad may comprise acoustic wave generator means and acoustic wave receiving means. More in detail, the surface acoustic wave touchpad may comprise at least a first acoustic wave generator for generating acoustic waves in a horizontal direction (x-direction) and a second acoustic wave generator for generating acoustic waves in a vertical direction (y-direction). Similarly, the surface acoustic wave touchpad may comprise at least a first acoustic wave detector for detecting acoustic waves in a horizontal direction (x-direction) and a second acoustic wave detector for detecting acoustic waves in a vertical direction (y-direction). The location of touching the touchpad may be determined based on a variation of surface acoustic waves received by said acoustic wave detectors.

It is worth mentioning that the upper-mentioned types of touch-pads may be transparent for light in the visible wavelength range and said touchpad and the transparent display may be arranged above one another. Thereby it is possible for a user to provide user input by means of the touchpad in the display area. Said touch pads may be of single touch type or multi-touch type.

Figure 5:
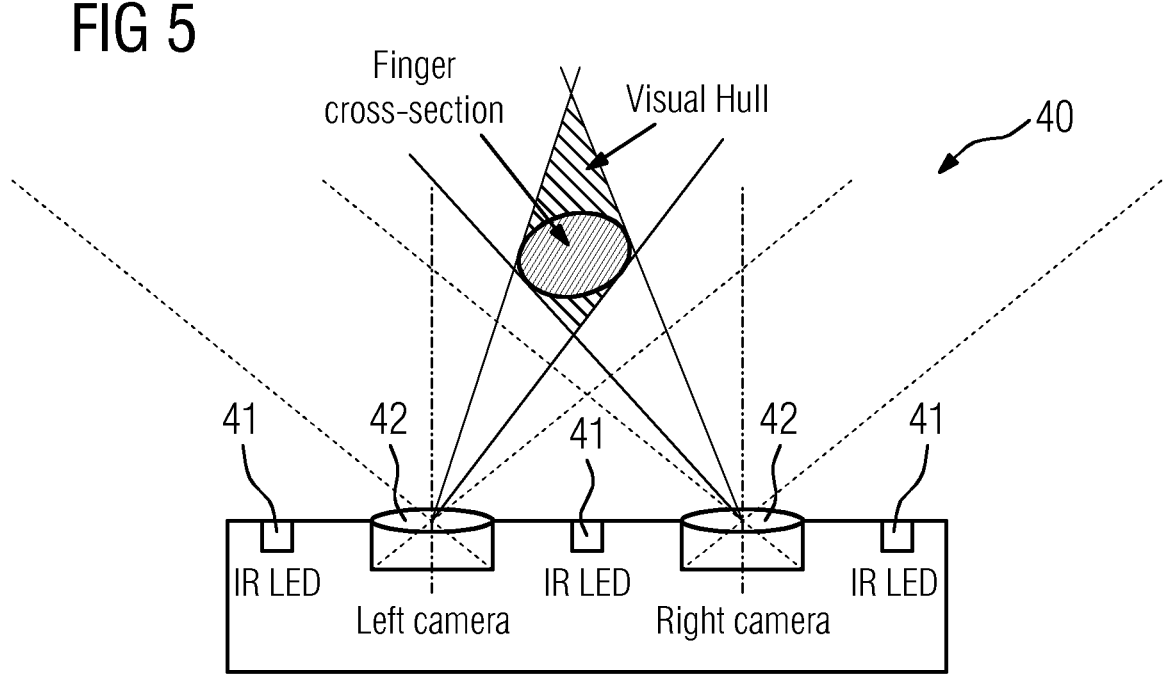
FIG. 5 shows an example optical touch and gesture recognition system.

According to another embodiment shown in FIG. 5, the user control interface may include optical touch or gesture recognition means based on an IR system comprising multiple IR transmitters and multiple IR receivers. An optical touch or gesture recognition system 40 may include multiple infrared transmitters 41, for example IR light emitting diodes. Said IR transmitters 41 may be adapted to transmit light in the IR wavelength spectrum towards the area in front of the door glass 11. In addition, the optical touch or gesture recognition system 40 may comprise multiple IR receivers 42, specifically at least a first and a second camera for receiving IR radiation. For optical touch or gesture recognition the fact is exploited that an object, e.g. the finger of a user, reflects IR radiation transmitted by the IR transmitters 41. Said reflected IR transmission is detected by said IR receivers 42 in order to determine the touch or approximation position of said object. The IR receivers 42 may be coupled with a control unit for determining the touch or approximation position based on the information received from the IR receivers 42 using complex localization algorithms.

The electrical connections between the oven door 10 and the oven base body 3 for providing power and control signals to the projection unit 13, respectively, the user control interface 30 may be realized by means of wires or in a wireless way. Also combinations of wired and wireless connections are possible.

The wired connection between the oven door 10 and the oven base body 3 may be realized by means of cablings through the door hinges or electrical connectors at the oven door 10 and the oven base body 3 wherein an electrical contact between an electrical connector at the oven door 10 and a corresponding electrical connector at the oven base body 3 is established when the oven door 3 is closed.

Wireless data transmission may be realized using wireless LAN or Bluetooth technology. Also proprietary wireless data transmission technologies may be possible. Wireless power transmission may be, for example, realized by means of inductive coupling.

Above, embodiments of an oven door according to the present invention as defined in the appended claims have been described.

These should be seen as merely non-limiting examples. As understood by a skilled person, many modifications and alternative embodiments are possible within the scope of the invention.

LIST OF REFERENCE NUMERALS 1 oven
2 oven cavity
3 oven base body
10 oven door
11 door glass
11.1 first glass pane
11.2 second glass pane
11.3 third glass pane
11.4 fourth glass pane
12 door handle
13 projection unit
14 graphical display
30 user control interface
31, 31' infrared emitter
32 infrared receiver
40 optical touch or gesture recognition system
41 IR transmitter
42 IR receiver

The invention claimed is:

1. An oven door for closing an oven cavity, said door comprising a door glass and a projection unit adapted to project incident light onto a projection area of the door glass in order to provide a graphical display on the door glass, said door glass comprising particles essentially equally distributed across said graphical display and being adapted to emit or reflect resultant light based on the incident light in order to display information visible from in front of the oven door, and a user control interface comprising a touch screen, a touchpad or a gesture recognition means, said user control interface at least partially overlapping said projection area and adapted to detect user interactions for controlling cooking functions.

2. The oven door according to claim 1, wherein the door glass comprises at least a light emission layer including the particles, said particles being adapted to emit the resultant light towards a space in front of the oven door based on the incident light provided by the projection unit.

3. The oven door according to claim 1, wherein the door glass comprises a transparent film comprising the particles, said particles being adapted to emit the resultant light towards a space in front of the oven door based on the incident light provided by the projection unit.

4. The oven door according to claim 2, wherein said particles are fluorescent particles which are adapted to emit light when activated by light of a certain activation wavelength and wherein the projection unit is adapted to emit light according to said activation wavelength.

5. The oven door according to claim 4, wherein the projection unit is adapted to emit light in the UV- or IR-wavelength spectrum.

6. The oven door according to claim 1, wherein the door glass comprises a holographic glass comprising the particles, said particles being adapted to reflect the resultant light towards a space in front of the oven door.

7. The oven door according to claim 1, wherein the projection unit is a Liquid Crystal on Silicon (LCoS) projection unit, a Digital Light Processing (DLP) projection unit or a micro-electromechanical system (MEMS) projection unit.

8. The oven door according to claim 1, wherein the user control interface comprises a touch-sensitive interface of resistive or capacitive type, an infrared touch interface or a touch interface based on surface acoustic waves.

9. The oven door according to claim 1, wherein said door glass comprises at least two glass panes, said glass panes being arranged at a distance from one another in order to form a space between adjacent glass panes.

10. The oven door according to claim 1, comprising cooling means for providing an airflow flowing through a space between two glass panes.

11. An oven for preparing food comprising an oven cavity included in an oven base body and the oven door according to claim 1.

12. The oven according to claim 11, wherein the projection unit is electrically coupled with a control unit and/or power supply arranged in the oven base body via an electrical wiring, an inductive coupling, door contacts and/or wireless transmission means.

13. The oven according to claim 11, wherein the user control interface is electrically coupled with a control unit and/or power supply arranged in the oven base body via an electrical wiring, an inductive coupling, door contacts and/or wireless transmission means.

14. The oven door according to claim 1, said particles comprising fluorescent particles integrated in a glass pane of said door glass or contained in a film disposed thereon and effective to absorb said incident light and to emit said resultant light, said projector being adapted to selectively project said incident light toward said projection area in a non-visible spectrum in order to selectively excite select particles among said fluorescent particles in order to emit said resultant light in a visible spectrum to display select information.

15. The oven door according to claim 14, said door glass comprising a first glass pane and a second glass pane spaced apart from one another and defining a space therebetween that is hermetically sealed and filled with an inert gas, one of said first and second glass panes comprising a heat-reflective coating, said user control interface being disposed in said space between the first and second glass panes.

16. The oven door according to claim 1, said particles comprising mirror-like particles integrated in a glass pane of said door glass or contained in a film disposed thereon and effective to reflect said incident light toward a space in front of said oven door.

17. The oven door according to claim 1, further comprising a door handle for opening the door, the projection unit being disposed on the door handle.

\* \* \* \* \*